Fig. 2

INVENTORS
Frank D. Wampler
Robert H. Bistline

United States Patent Office 3,253,720
Patented May 31, 1966

3,253,720
INVERTING ARTICLES
Robert H. Bistline, Dayton, and Frank D. Wampler, Brookville, Ohio, assignors to General Motors Corporation, Detroit, Mich., a corporation of Delaware
Filed Apr. 1, 1964, Ser. No. 356,466
10 Claims. (Cl. 214—1)

This invention pertains to inverting articles and more particularly to turning refrigerator cabinets and similar articles carried upon a conveyor.

In manufacturing it is desirable to eliminate arduous repetitious labor whenever feasible. One example is the inverting or turning of refrigerator cabinets and similar articles carried upon a conveyor. The turning of articles carried on a conveyor is often required for the completion of coating or the ease of assembly. Since the cabinets are large and substantial in weight and thousands may be required to be turned or inverted every day, a number of men may be required to perform this arduous task.

It is an object of this invention to provide a method of and apparatus for turning and especially inverting articles, particularly those having a box shape which are carried on a conveyor.

It is another object of this invention to provide a method of and apparatus for removing articles from a moving conveyor, turning or inverting the articles and then replacing the articles in the turned or inverted position upon the conveyor.

It is another object of this invention to provide a conveyor system with a fixture having a means for automatically clamping an article to the fixture, removing the article from the conveyor by moving the fixture, turning or inverting the article and the fixture, and then moving the fixture to replace the article in the turned or inverted position upon the conveyor by releasing the article from the fixture.

It is another object of this invention to provide a conveyor system with a control system and a method of and apparatus for selectively turning or inverting some of the articles of one particular type carried upon a conveyor and continuing the movement of articles of another particular type upon the conveyor or without this turning or inverting.

It is another object of this invention to provide a conveyor system with a means for holding and aligning an article upon the conveyor with a moving rotating fixture together with means for transferring the articles from the conveyor to the fixture, turning the fixture with the article thereon, transferring the article from the fixture to the conveyor in the turned position, preferably placing the article in the place it previously occupied on the conveyor.

These and other objects are attained in the form shown in the drawings in which an overhead type of monorail chain connected conveyor is provided with hook shaped supports for supporting cabinets such as refrigerator cabinets as well as doors. A rotary fixture carrying device is centered within and beneath a loop of the conveyor. The fixtures are connected by several pairs of parallel links to a rotary member and revolved in synchronization with the movement of the conveyor. The fixtures are manipulated through the use of three cam tracks which cooperate with cam followers connected to the ends of two of the parallel links and a cam follower on each of the fixtures. These cams control the fixtures so that the fixtures are moved into engagement with the cabinets and clamp the cabinets thereon, removing them from their conveyor supports away from the conveyor then through the use of a Geneva-type motion turning the fixture and the cabinet through 180°, after which the fixture and the cabinet is carried back to the conveyor support and released thereto for a resumption of the movement upon the conveyor. As the fixture passes beneath the conveyor, it is again rotated 180° prior to return to its starting position. For preventing the turning of the doors when they are carried by the conveyor, a light sensitive control located in the beam of a spotlight passing through a zone in the path of the cabinets actuates a control system by which one of the cam followers is directed to another cam track which will prevent the fixture from removing the doors from the conveyor. The doors or other similar articles then continue on the conveyor without being turned.

Further objects and advantages of the present invention will be apparent from the following description, reference being had to the accompanying drawings wherein a preferred embodiment of the present invention is clearly shown.

Figure 1:
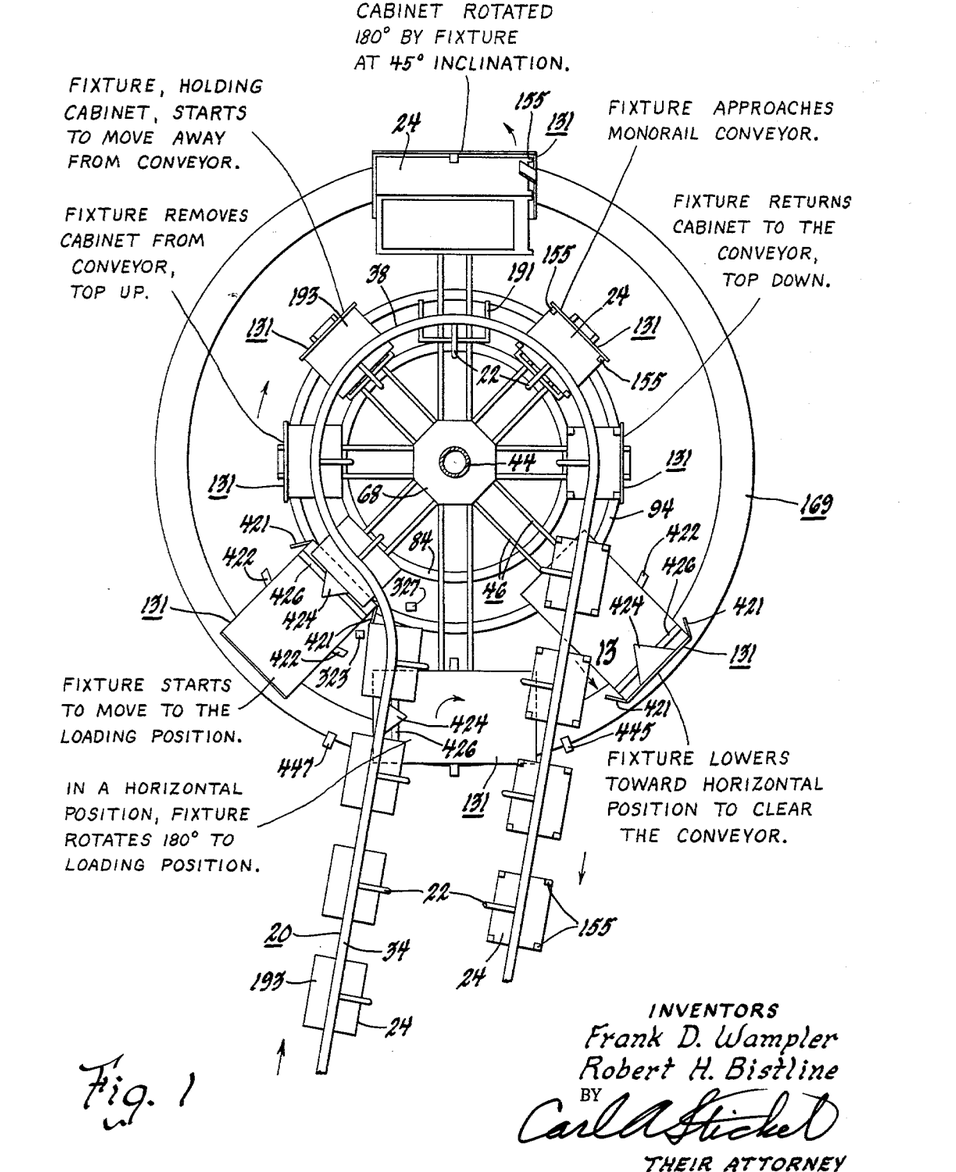
FIGURE 1 is a diagrammatic plan view of a monorail type conveyor having a fixture rotating device associated with the loop of the conveyor.
Figure 11:
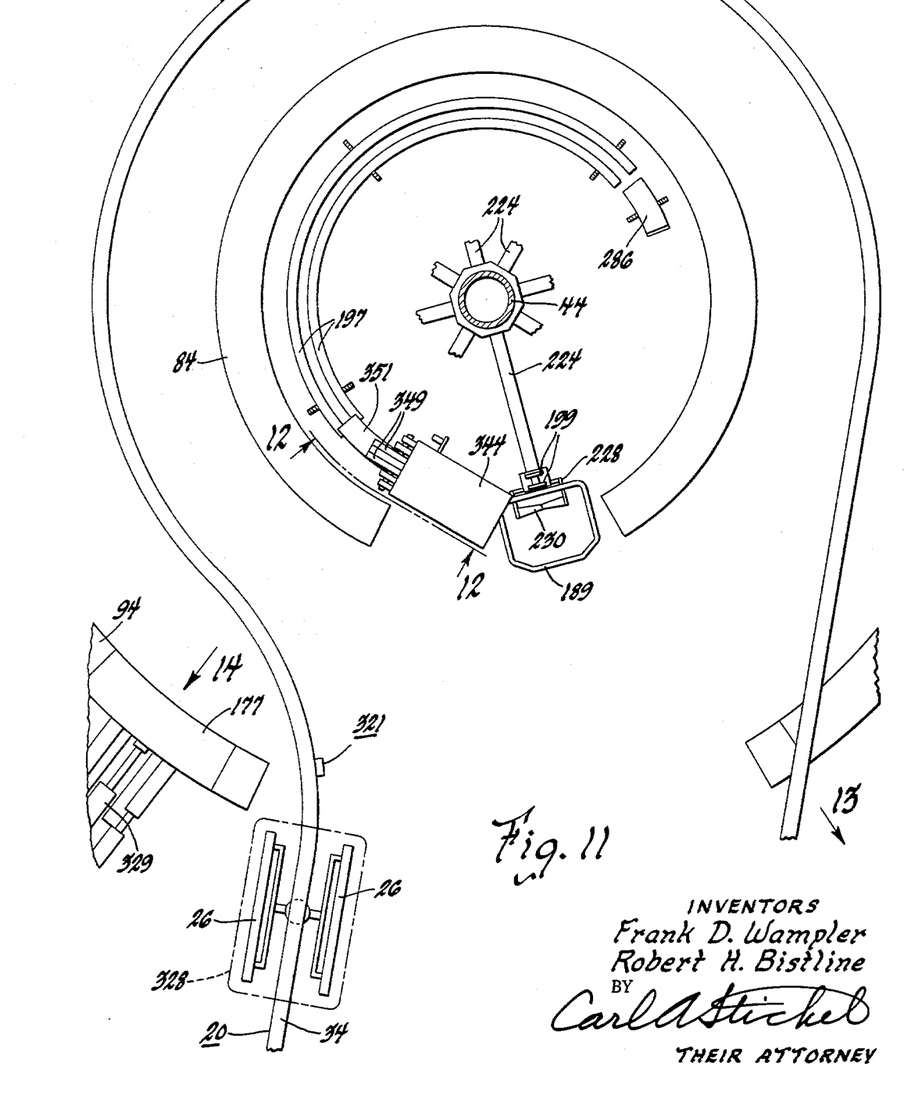
FIGURE 11 is a plan view partly diagrammatic illustrating the cam switching arrangements.

Referring now to the drawings and more particularly to FIGURES 1 and 11, there is shown partly diagrammatically a monorail conveyor 20 provided with hook shaped supports 22 for supporting articles such as the refrigerator cabinets 24 shown in FIGURE 1 or the doors 26 which are carried in pairs upon the supports as shown in FIGURE 11. The conveyor 20 is provided with a chain 28 (see FIGS. 2 and 4) connecting together the supports 22 throughout the conveyor system. The supports are each connected to a yoke 30 carrying the pairs of rollers 32 (see FIG. 4) which roll between the flanges of the I beam support 34 which is suspended from suitable support brackets 36. The I beam conveyor 20 is provided with a circular loop portion 38 having about 225° of circular track as shown in FIGURE 1. The chain 28 at this loop portion 38 rides upon a series of rollers 40 rotatably mounted upon the brackets 42. The cabinets 24 are received on the conveyor 20 in the upright position as shown on the left above the upward pointing arrow in FIGURE 1. It is desired for further processing that the cabinets be inverted on the right adjacent the downward pointing arrow as shown in FIGURE 1 before proceeding further upon the conveyor 20. The doors 26, however, need not be inverted. Heretofore it has been necessary to manually remove the cabinets 24 from the monorail conveyor 20 and invert the cabinets and thence replacing the cabinets on the conveyor 20 in the inverted position. In accordance with our invention we provide a means for automatically removing the cabinets 24 from the conveyor 20 inverting them and replacing the cabinets 24 in the inverted position in the same consecutive order upon the conveyor 20. The doors 26 and other articles remain on the conveyor by a selective automatic light responsive control without being inverted.

Figure 2:
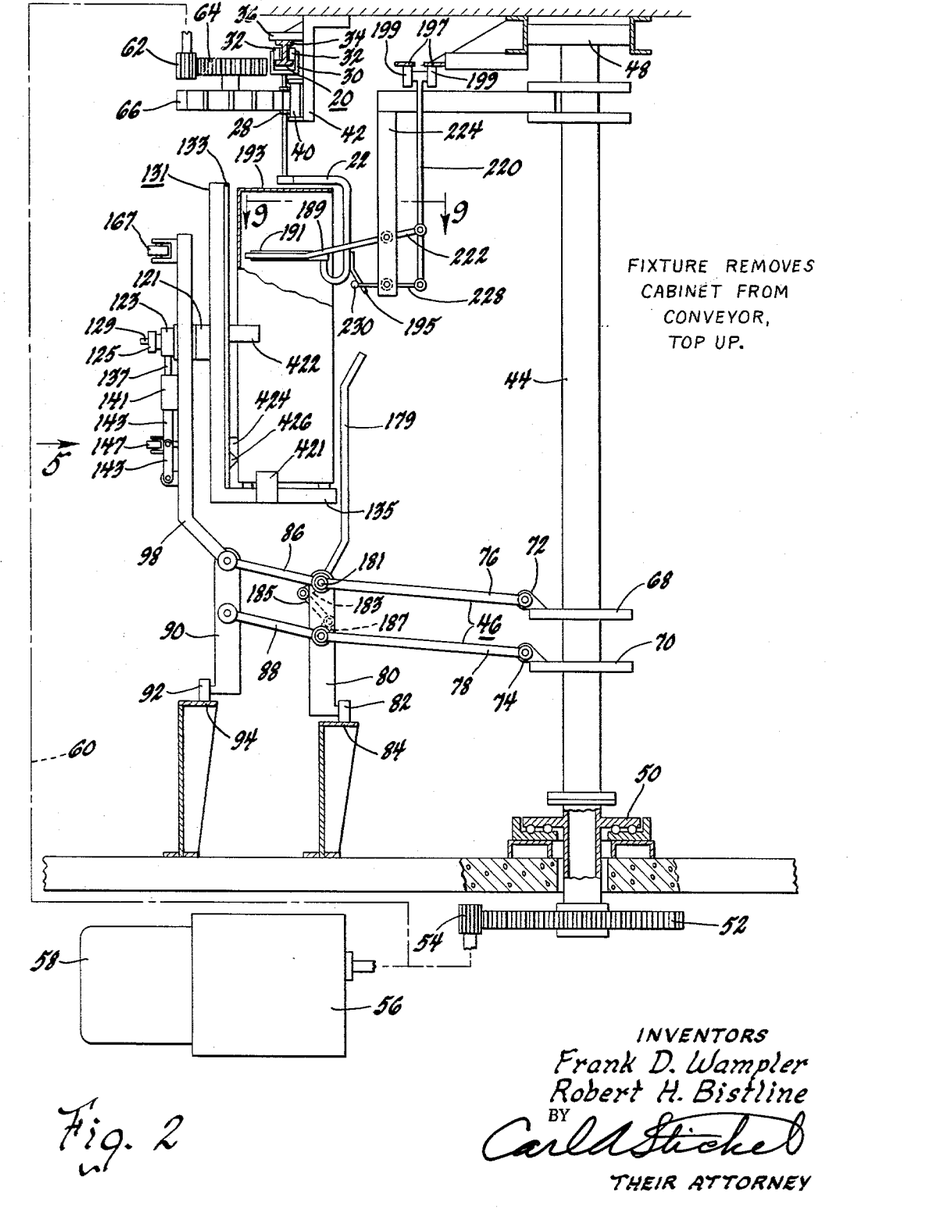
FIGURE 2 is a fragmentary view in elevation partly in section at the loading station.

As shown in FIGURE 1 in the center of the loop 38, we provide a rotatable hollow pole 44 having pivotally connected to it eight sets of parallel links 46. The pole 44, as shown in FIGURE 2, is supported by an upper bearing 48 and a lower bearing 50. The pole 44 connects to a large gear 52 driven by the pinion 54 through the reduction gearing 56 from the electric motor 58. The rotation of the pole 44 is synchronized with the movement of the monorail conveyor 20 by any suitable means. As shown diagrammatically, the gearing 56 is connected through a connection 60 with a pinion 62 driving a large gear 64 having connected to it a sprocket 66 extending into driving engagement with the chain 28 of the monorail conveyor 20.

Figure 5:
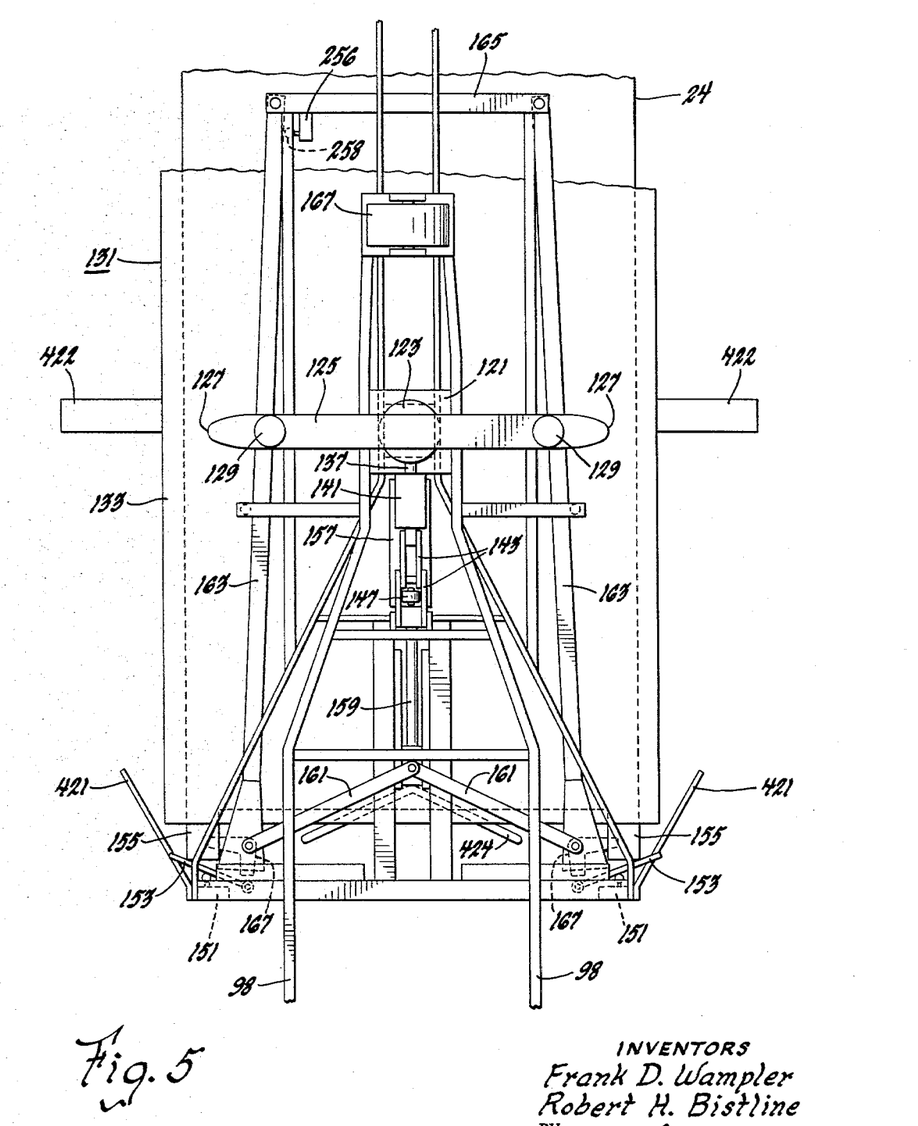
FIGURE 5 is a fragmentary view in elevation in the direction of the arrow 5 in FIGURE 2 showing the outer side of the fixture with the cabinet thereon.

The pole 44 has fixed to it an upper and a lower disk 68 and 70 each provided with eight dual pivotal connections 72 and 74 respectively which provide the pivotal connections with the eight sets 46 of parallel links. Each of the sets 46 of parallel links include a pair of upper links 76 connected to the pivotal connection 72 and a pair of lower links 78 connected to the pivotal connections 74. At their opposite ends the pairs of parallel links 76 and 78 are pivotally connected to a movable upright 80 provided with a cam roller follower 82 which rides upon the inner cam track 84. This movable upright 80 is connected by upper and lower pairs 86 and 88 of parallel links which are pivotally connected to a second movable upright 90 provided with a roller cam follower 92 adjacent its lower end which is adapted to ride upon either the central cam track 94 or below this track as selected by a cam switching arrangement to be described hereinafter. The upper pair of parallel links 86 are integrally connected to a frame 98 better shown in FIGURE 5. This frame 98 connects to a bearing block 121 providing a bearing for a very short shaft means 123 having mounted thereon a transverse bar 125 having pointed rounded noses 127 at its opposite ends and also rotatably supporting the rollers 129 inwardly of each of the rounded noses 127. The shaft means 123 on the opposite side of the frame as viewed in FIGURE 5 is connected to an L shaped fixture 131.

Figure 3:
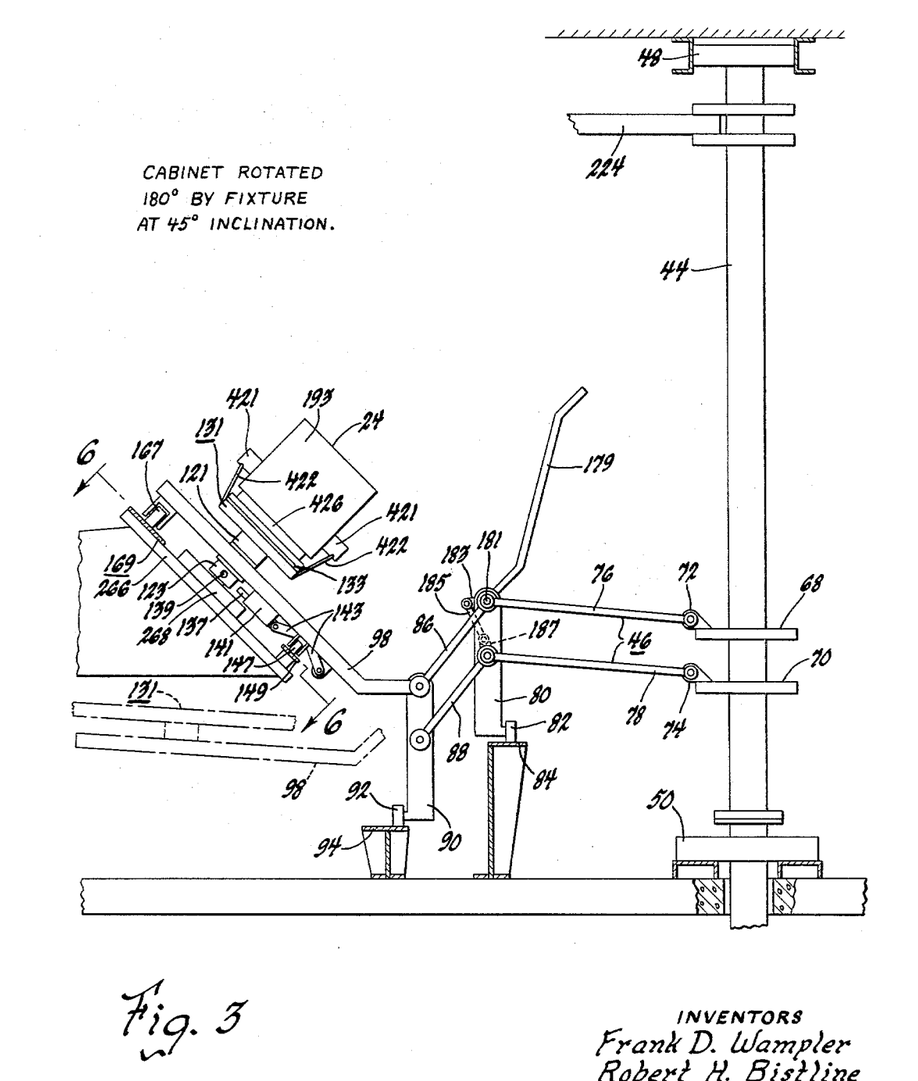
FIGURE 3 is a view somewhat similar to FIGURE 2 showing the fixture with the cabinet thereon at an intermediate point in its rotation at the rotating station.

This fixture 131 includes a large rectangular plate 133 and a platform 135 connected to one edge and extending therefrom at right angles to form an L shaped configuration as viewed in FIGURE 2. Each of the fixtures 131 are identical. Each includes a locking pin 137 adapted to engage recesses 139 located at intervals of 180° in the shaft means 123 for the purpose of locking the fixture in the position desired. The locking pin 137 is slidably mounted in the bearing support 141 and connected by a set of toggle links 143 to an anchorage 145. At the pivotal connection between the set of links 143 is a cam roller follower 147 which whenever it is desired to release the pin 137 rides upon a cam track 149 which pivots the toggle links 143 to retract the pin 137 as indicated in FIGURE 3. To move the pins 137 to locking position, the cam track 149 is omitted and the links 143 are removed by a spring (not shown) into aligning position against a suitable stop (not shown) to project the pin 137 into the recess 139 for locking the shaft means 123 in the position desired.

The platform portion 135 is provided upon two of its corners nearest the plate 133 with the air valves 151 (shown diagrammatically) having their actuators normally in the closed position. These valves are provided with the tripping levers 153 located so as to be engaged by the rear corner feet 155 of the cabinets 24 as shown in FIGURE 5 when the cabinets are engaged by the fixture 131 as shown in FIGURE 2. The fixture 131 also includes a relatively large air cylinder 157 having within it a piston connected to a projecting rod 159 connected at its lower end to the pivotal connection between a pair of toggle links 161. This pivotal connection has connected to it a bearing block guided between guideways. The outer ends of the toggle links 161 are pivotally connected to the lower or inner end of a pair of long levers 163 which are pivotally mounted to the ends of the cross member 165 at the top or outer end of the fixture 131. The levers 163 adjacent their pivotal connection with the toggle levers 161 are provided with pivotally mounted L shaped clamping members 167 which are adapted to engage the upwardly turned flanges on the inside of the rear legs 155 of the cabinet 24. The L shaped clamping members 167 are permitted to have only a limited pivotal movement so that they are in the proper position to engage the legs 155 whenever the legs 155 are properly located on the fixture 131. The frame 98 is provided at its upper or outer end with the cam follower roller 167 which is adapted to roll upon the outer cam 169.

Figure 7:
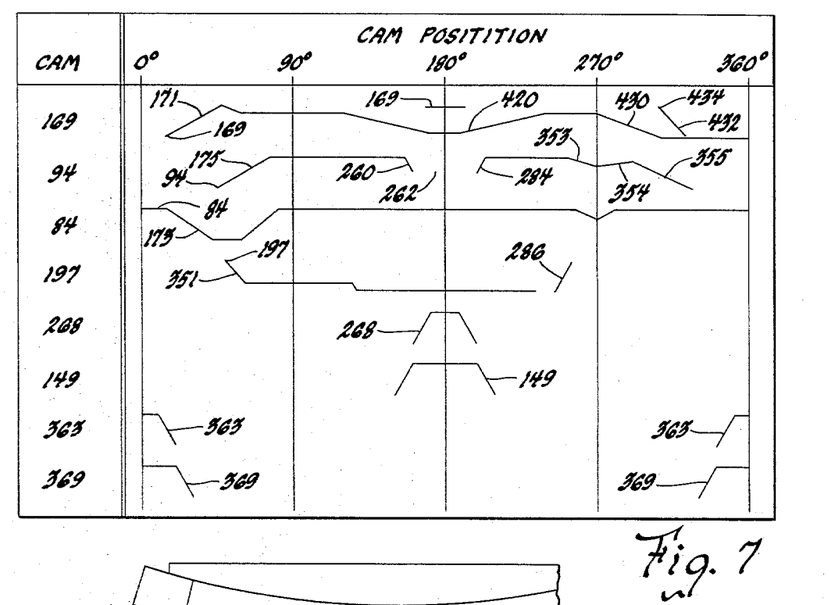
FIGURE 7 is a diagrammatic layout of the various cams incorporated in the mechanism.

When the conveyor 20 is in operation, the pole 44 will revolve the fixture 131 in synchronism with the hook supports 22. The outer, center and inner cams 169, 94, and 84 have a contour as is shown in the cam layout diagram of FIGURE 7. Between about zero and 45° the outer cam 169 has a rise 171 and the inner cam has a fall 173 which combine to begin the lifting of the fixture 131 after it has passed beneath the parallel sections of the conveyor 20. This lifting of the fixture 131 is continued by the engagement of the cam follower 92 with the rise 175 at the beginning of the center cam 94. For the purpose of preventing the rise of the fixture 131 when the doors or other articles are carried upon the supports 22, the center cam track 94 is provided with a switch 177 which when withdrawn causes the cam follower 92 to operate below the center cam or track 94 to prevent the fixture 131 from becoming operative to lift an article from the conveyor 20. This will be explained in detail hereinafter.

Figure 10:
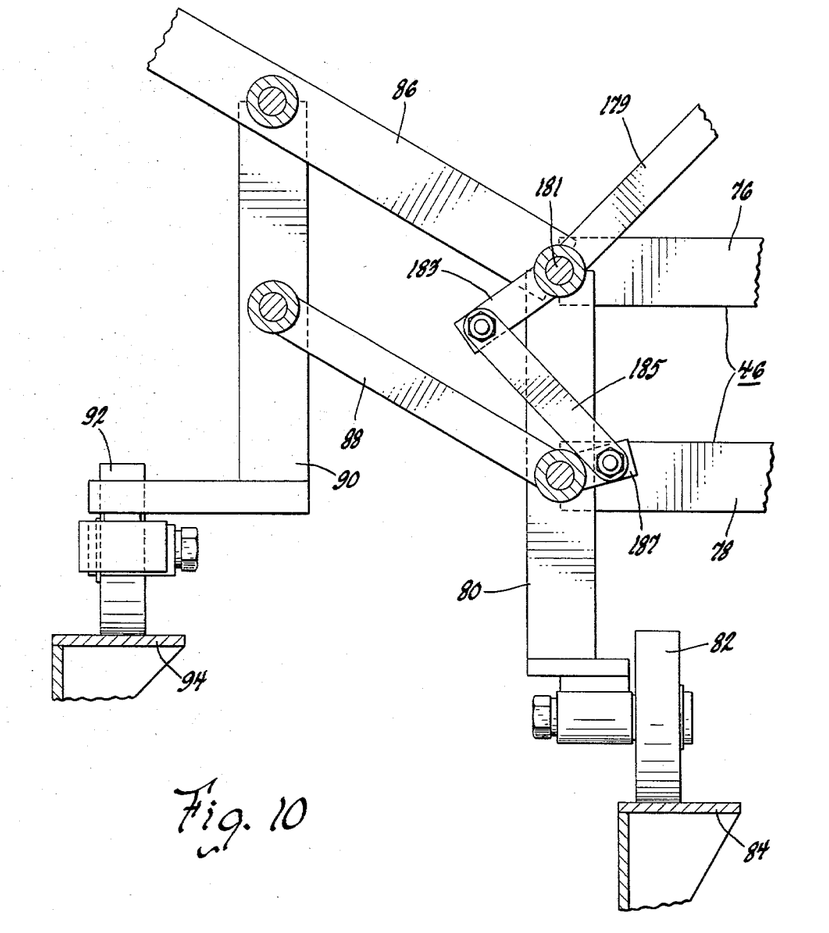
FIGURE 10 is a fragmentary vertical sectional view of an intermediate portion of the parallel linkage together with the associated cam followers and cam tracks and levers.

Assuming the switch 177 is closed to make the upper track 94 effective, the rise 175 in the cam 94 will set the fixture up first and then will lift the fixture 131 until it approaches one of the cabinets 24. As shown in FIGURE 2, there are a pair of upwardly extending arms 179 to the right of the cabinet 24. As is better shown in FIGURE 10, these arms 179 are pivoted on the link pin 181 between the upper pairs of links 76 and 86. This pair of arms 179 also has extending in the opposite direction from the link pin 181 a pair of integral arms 183 connected at their ends to a pair of links 185 extending to and being pivotally connected to a pair of arms 187 which are rigidly connected to the pair 88 of lower parallel links. This link connection 185 between the arms 187 and 183 causes a counterclockwise movement of the arm 179 as it moves toward the position in FIGURE 2 so that the cabinet 24 is prevented from moving away from the fixture 131 as the fixture 131 is being moved toward the cabinet 24.

Figure 9:
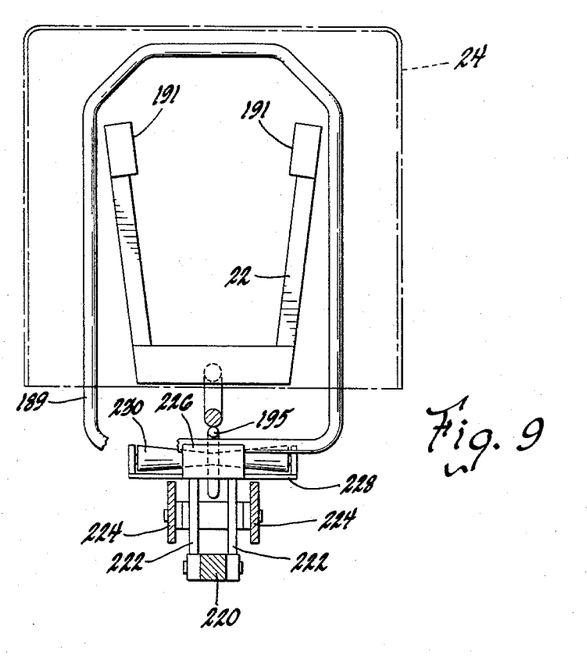
FIGURE 9 is a fragmentary sectional view taken substantially along the lines 9—9 of FIGURE 2 showing the cabinet support together with the aligning loop and the mechanism for holding the cabinet support in alignment with the fixture during the transfer.

Assisting with the guiding of the supports 22 into the cabinet 24 is the loop-shaped guiding member 189 (see FIG. 9), which is large enough to encircle the hook-shaped supports 22 which have a set of diverging arms 191 extending into and normally supporting the cabinet 24 by its top 193. These supports 22 also include an integral arm 195. As the fixture 131 approaches the cabinet 24 an upper dual cam 197 (see FIGS. 2 and 11) is engaged by an upper pair of roller cam followers 199 connected by a link 220 to the pair of arms 222 which are pivoted to the revolving support 224 connected to and revolving with the hollow pole 44. Seven other similar supports and arms are symmetrically arranged and connected to the hollow pole 44. The pair of arms 222 (see FIG. 9) connect through the block 226 with the loop member 189. The link 220 also has an extension which pivotally connects with the end of a lever 228 which is pivotally mounted on the lower end of the support 224 and has connected to its outer end a roller 230 having conical surfaces which converge toward the center where is provided a small groove. When the roller follower 199 engages the downwardly deflecting gate cam surface 351 (see FIG. 7) of the upper cam 197, the loop aligning member 189 is moved into the interior of the cabinet 24 to the position shown in FIGURE 2 surrounding the support arms 191 and at the same time the roller 230 is brought into engagement with the arm 195 so as to stop any tendency of the support 22 to swing upon the conveyor 20. In combination with the arms 179, the cabinet 24 is held in substantial alignment with the fixture 131 as the fixture 131 continues to rise until it lifts the cabinet 24 off the support arms 191. To assist in properly locating the cabinet 24 on the fixture 131, the platform 135 has at the sides wide guiding extensions 421 extending diagonally upwarding and outwardly at an angle of about 45°. The large rectangular plate 133 likewise has guiding extensions 422 extending diagonally outwardly and forwardly at an angle of about 45°. The face of the plate 133 is provided with an inverted V-shaped projection 424 and laterally extending ribs 426 for centrally locating the legs 155 of the cabinet 24 upon the fixture 131. At this lifting point, the rear pair of feet 155 of the cabinet 24 engage the tripping levers 153 to operate the actuators to open the three-way valves 151.

Figure 16:
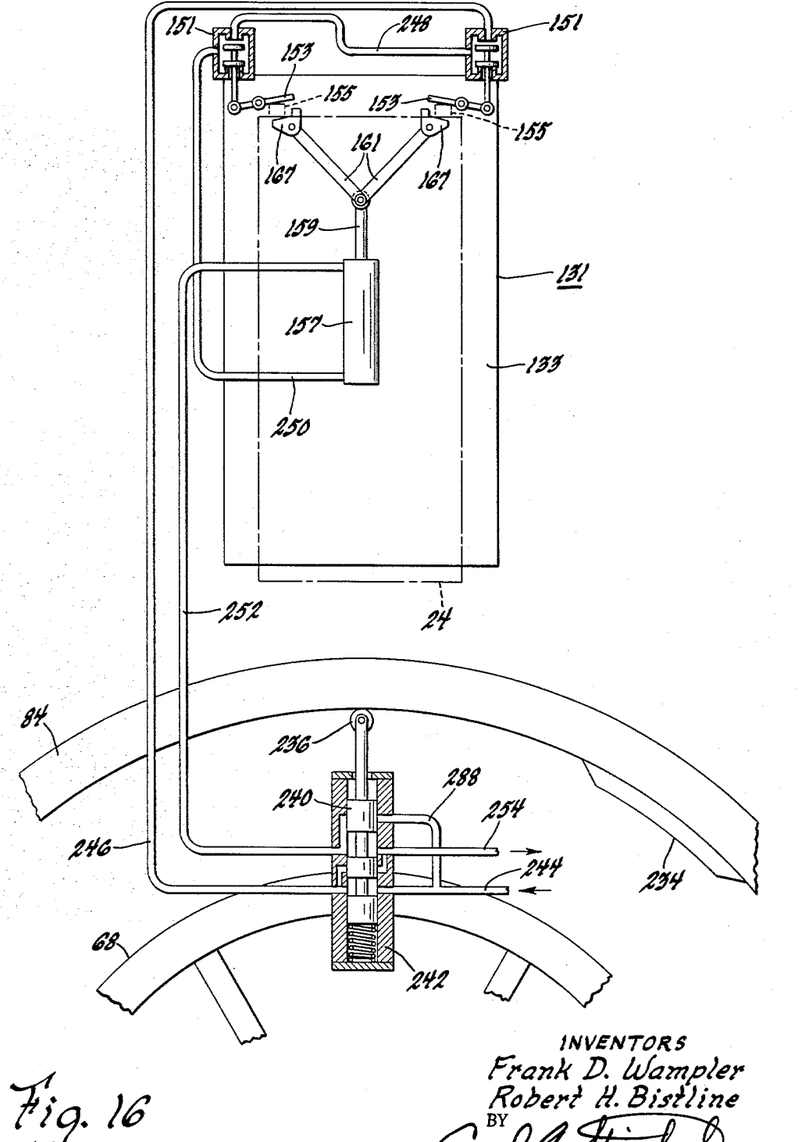
FIGURE 16 is a plan view, partly diagrammatic, of the system for clamping the articles or cabinets to the fixture.

As shown in FIGURE 16, the valve 240 connects the air supply 244 through the casing 242 with the conduit 246 connecting in series through the two valves 151 and the conduits 248 and 250 with the one end of the air cylinder 157. The other end of the air cylinder 157 is connected through the conduit 252 and the valve housing 242 through another section of the valve 240 to the exhaust conduit 254. This causes the piston rod 159 to be projected toward the toggle links 161 to apply the clamping members 167 to the inside of the legs 155 of the cabinet 24. As a safety measure there is provided on the cross member 165 (see FIG. 5) a safety switch 256 actuated by a projection 258 upon one of the levers 163 which will stop the apparatus in the event that the levers 163 are not moved outwardly.

Figure 6:
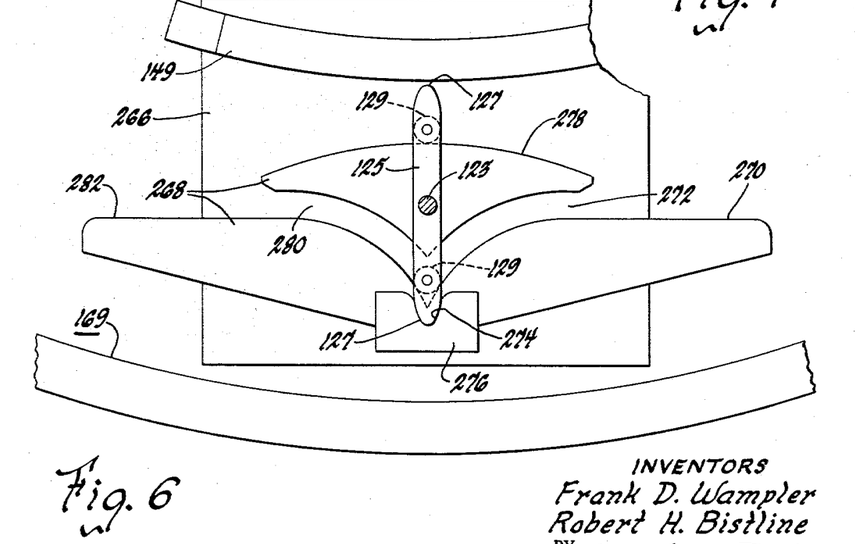
FIGURE 6 is a fragmentary sectional view taken along the line 6—6 of FIGURE 3 showing the Geneva-type turning mechanism.

As the fixture 131 continues to be carried by its linkage with the pole 44 about the center thereof, the cam follower 92 encounters a fall 260 (see FIG. 7) in the central cam 94 which will cause fixture 131 to move away from the conveyor to an angle of about 45° onto a short section of the outer cam track 169 on a platform 266 as illustrated in FIGURE 3. At the bottom of this fall 260 in the central cam 94 is an interrupted zone 262. The outer cam track 169 by supporting the follower 167 during the movement through this interrupted zone maintains this 45° inclination of the fixture 131. During this portion of the movement, the fixture 131 is carried over the platform 266 supporting the components of a Geneva cam 268 and also this portion of the outer cam track 169 and the cam 149. Also at this time, the roller follower 147 connecting with the pivotal connection between the toggle links 143 engages the cam 149 to retract the locking pin 137 as shown in FIGURE 3. This retraction continues throughout the time the Geneva cam is effective since the cam 149 is in engagement with the roller follower 147 throughout this portion of the movement. At the time at which the locking pin 137 is withdrawn, the rollers 129 are aligned with the surface 270 (see FIG. 6) of the Geneva cam 268. The rollers are fed into the slot 272 causing the bar 125 to be turned counterclockwise until its nose engages the notch 274 in the block 276 which in effect constitutes a tooth rack. This causes the second roller to ride over the curved outer surface 278 until the assured continuation of the counterclockwise turning of the bar 125 causes the other roller to continue trailing through the slot 280 and both rollers to engage the trailing surface 282 to complete the 180° rotation of the shaft means 123. At this time the roller follower 147 rides off the end of the cam 149 causing the spring applied to the toggle links 143 to move the locking pin 137 back into the adjacent recess 139 to lock the shaft means 123 and the fixture 131 in a position 180° from the position shown in FIGURE 5. This completes the 180° turning and inverting of the cabinet 24 and the fixture 131.

Following this inverting of the fixture 131 and the cabinet 24, the roller follower 92 at the end of the horizontal portion 262 encounters the rise 284 of cam 94 (see FIG. 7) thereby gradually lifting the cabinet 24 and the fixture 131 toward the support or hanger 22 depending from the monorail conveyor 20 upon which this particular cabinet 24 originally was suspended. This movement continues until the cabinet 24 and the fixture 131 are aligned with and moved over the support 22 on which the cabinet was originally suspended. The upper cam 197 retains the loop shaped aligning member positioned horizontally surrounding the support arms 191 and in conjunction with the hook 195 engaged by the roller 230 assures that the support 22 is guided properly into the interior of the cabinet 24. After continued movement in this aligning relation, the upper cam follower 199 (see FIG. 12) reaches the end of the continuous portion of the upper cam 197 (see FIG. 11) so that the loop member 189 and the roller 230 are withdrawn by gravity. This will thrust upwardly the roller follower 199. However in the event that there should be any friction which might prevent the gravity withdrawal of the loop member 189 and the roller 230, there is provided an added upwardly inclined cam surface 286 in the path of movement of the upper follower 199 which will cam the follower 199 upwardly so as to positively move the loop member 189 out of the interior of the cabinet 24 and the roller 230 out of engagement with the hook 195. This is illustrated in FIGURE 4.

The stationary cam 234 is located on the inside of cam track 84 approximately in a corresponding position so as to move the four-way valve 240 from its original position to a reversing position in which the supply conduit 244 is connected through a branch conduit 288 with the conduit 252 connecting with the upper end of the air cylinder 157 as viewed in FIGURE 16 while the lower end of the air cylinder 157 is connected through the conduit 250, the valves 151, the conduits 248 and 246 with the exhaust conduit 254 to release the clamping members 168 from the legs 155 of the cabinet 24 so that the cabinet 24 will drop onto the portion 191 of the support 22 in the inverted position with the legs up. The cabinet 24 will then continue to move on the conveyor in the inverted position for further processing. When the cabinet 24 is dropped, the tripping levers 153 (see FIG. 16) are released thereby causing the valves 151 to be operated to close their connections with the conduit 246 and to open a vent connecting with the conduit 252, thereby assuring complete retraction of the clamping members 167. The roller cam follower 236 will then roll off the end of the cam 234 to make the fixture ready to receive another cabinet on the next round.

Figure 12:
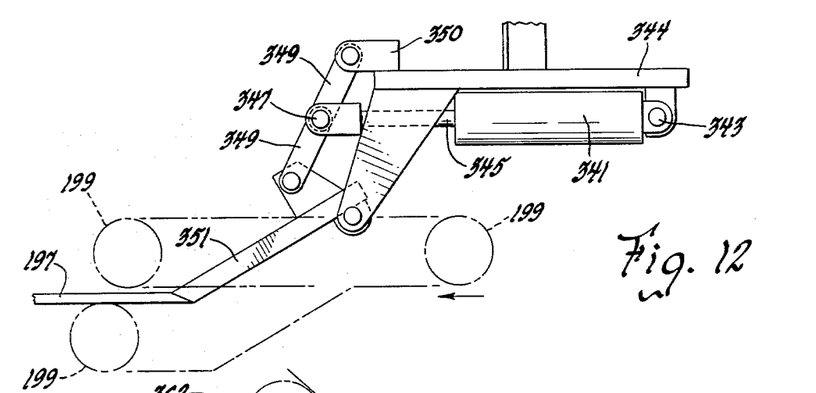
FIGURE 12 is a view in elevation of the upper cam switching means taken as illustrated by the arrows 12—12 of FIGURE 11.
Figure 15:
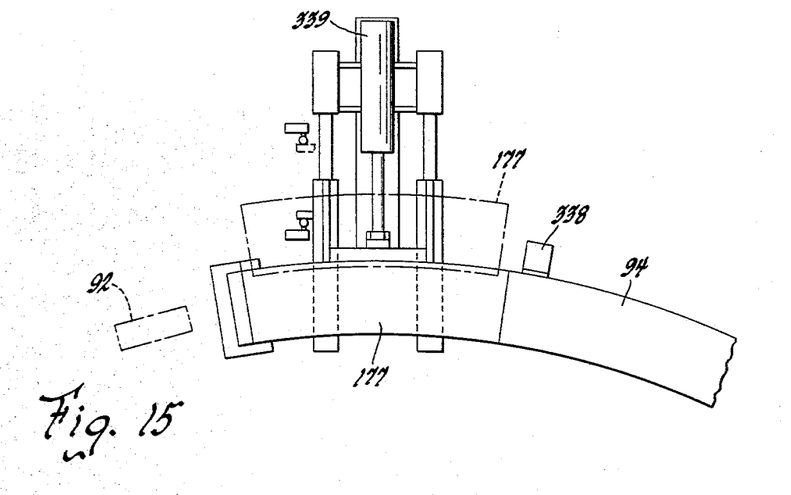
FIGURE 15 is a plan view of the switching means shown in FIGURE 14.
Figure 17:
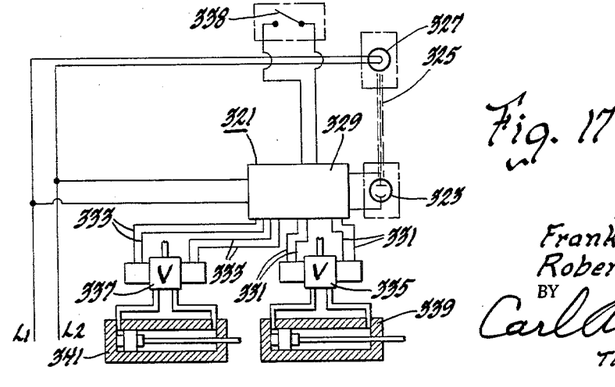
FIGURE 17 is a diagram of the cam switching control system.

The system for inverting a fixture is rendered ineffective individually when a support 22 carrying the doors 26 approaches the loading station on the conveyor. The supports 22 carrying the doors 26 have large covers 328. The conveyor 20 is provided with a detector 321 (see FIG. 11) for the purpose of detecting the presence of the doors 26 in a position approaching the inverting device. This detector, for example, may be a light responsive cell 323 (FIG. 17) located so as to receive a light beam 325 from a light source 327 through the space adjacent the supports 22 as viewed in FIGURE 11. This beam 325 will be interrupted by the covers 328 (shown in dot dash outline) over the doors 26 and similar articles. The photocell or light responsive cell 323 is connected to an amplifying device 329 incorporating a suitable time delay and electrical connections 331 and 333 with the solenoid operated air valves 335 and 337 individually associated with the air cylinders 339 and 341. The device 329 is also provided with a limit switch 338 located (see FIGS. 15 and 17) adjacent the intermediate cam track 94 at a point immediately beyond the switch 177 which deactivates the device 329 as soon as the support or hanger 22 carrying the doors 26 has passed the switching point 177 so that if a cabinet immediately follows, it will be sent over the upper cam track 94 to be turned. When the light beam 325 is obstructed by the cover 328 over the doors 26, the piston within the air cylinder 339 will move towards its closed end to withdraw the switching section 177 from the cam track 94 so that the outer track roller follower 167 will pass beneath the platform 266 so that the follower 167 rolls upon the lower outer cam track 420. This lower outer cam track 420 will hold the fixture 131 horizontally keeping it away from the conveyor 20 and particularly keeping the fixture 131 away from the doors 26. Since the fixture is held horizontally by the lower cam track 420, when it approaches the first Geneva cam 268, it will continue and pass beneath the first platform 266 as illustrated in dot-dash lines in FIGURE 3. It will then continue in a horizontal position keeping away from the conveyor 20 and the doors 26. Simultaneously with the valve 335, the valve 337 operates an air cylinder 341 (FIG. 12) having at one end a pivotal connection 343 with a platform 344 and having at the opposite end a piston rod 345 which is linked at its end to the pivotal connection 347 between the pair of toggle links 349. The upper link 349 is pivotally connected to a support 350 on the platform 344, while the lower toggle link 349 is pivotally connected to a gate 351. The operation of the air cylinder 341 lifts the gate 351 from the position illustrated in FIGURE 12 above the upper track 197 to allow the roller follower 199 connected to any loop member 189 which is aligned with the doors 26 to continue above the upper track as indicated in FIGURE 12 so as to keep the loop member 189 and the roller 230 away from the doors 26 throughout the length of the upper track 197.

Figure 4:
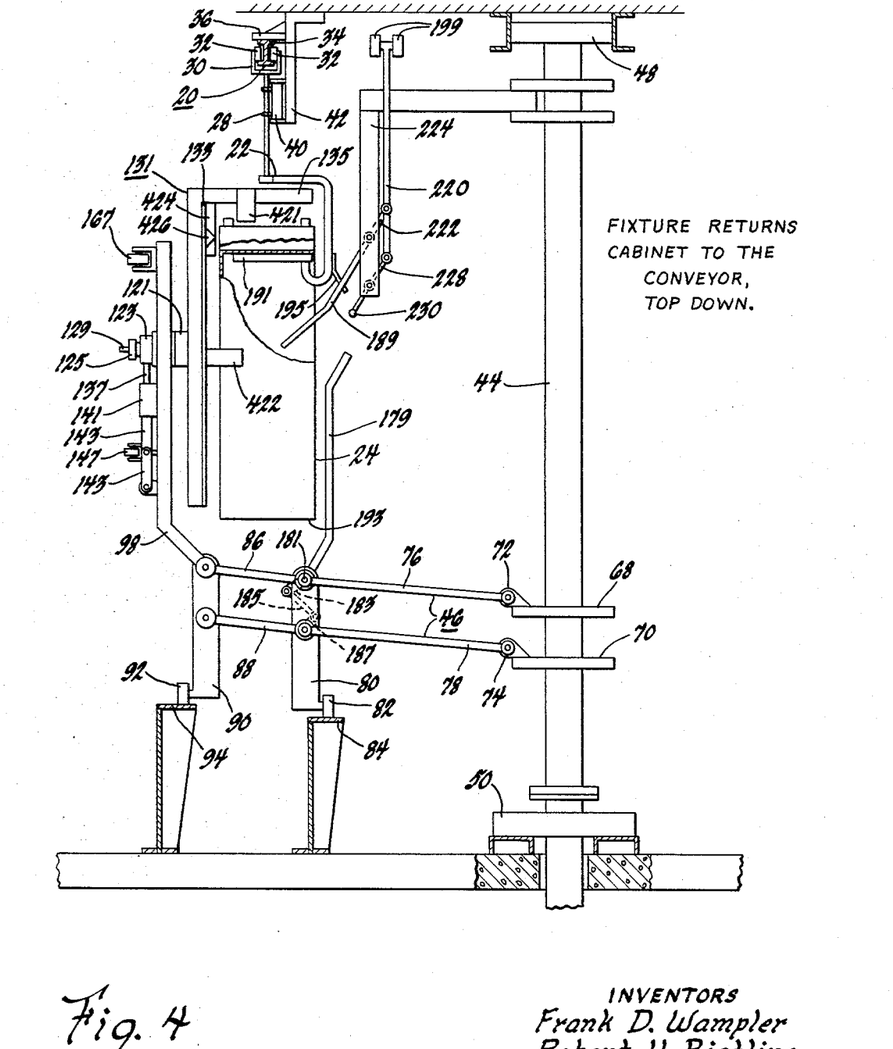
FIGURE 4 is a view somewhat similar to FIGURES 2 and 3 showing the fixture and the cabinet in the return location returning the cabinet to the conveyor.
Figure 8:
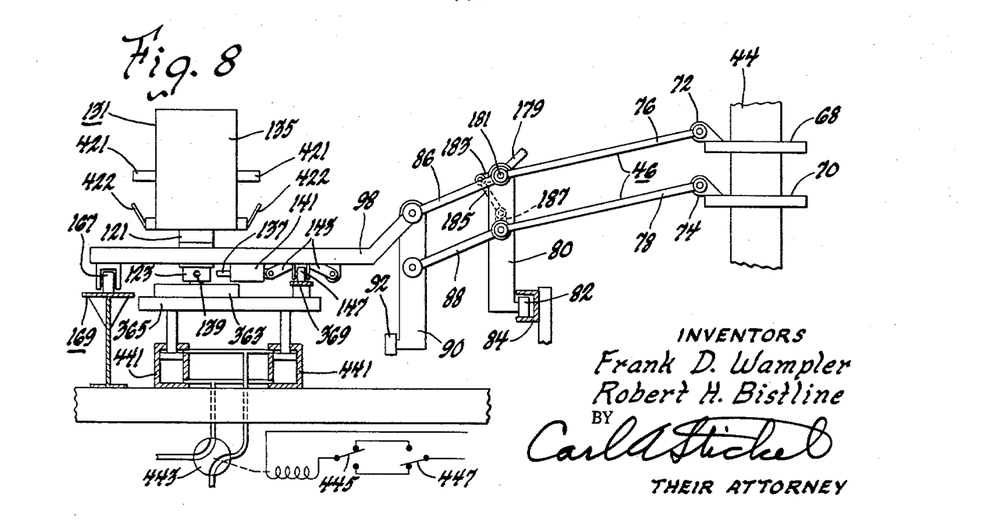
FIGURE 8 is a view somewhat similar to FIGURES 2, 3, and 4 showing the fixture in its second rotating position beneath the conveyor.
Figure 13:
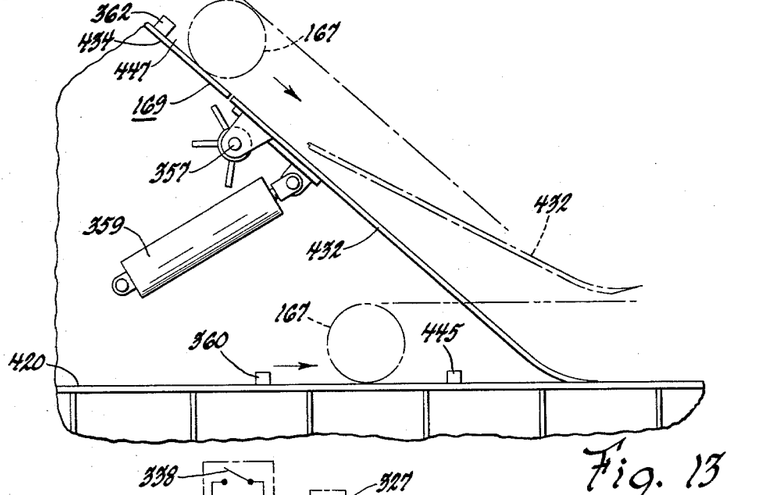
FIGURE 13 is a view in elevation of the cam switching means provided for the outer cam taken in the direction of the arrow 13 as illustrated in FIGURES 1 and 11.
Figure 14:
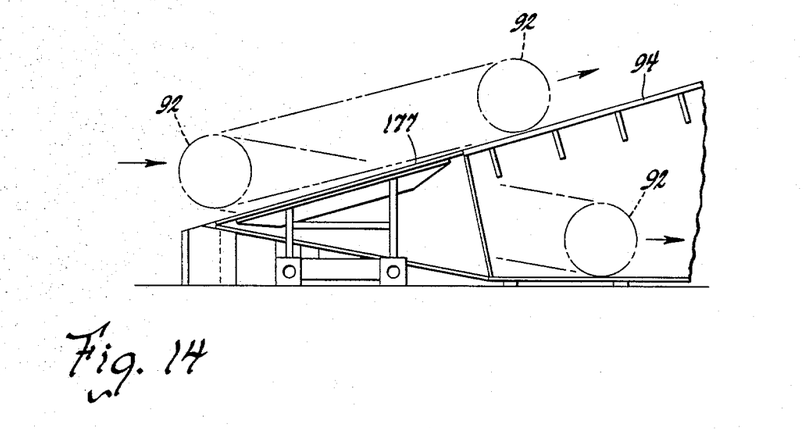
FIGURE 14 is a view in elevation of the initial switching means for the outer cam viewed as indicated by the arrow 14 in FIGURE 11.

After the fixtures 131 have passed the reloading station illustrated in FIGURE 4, they must pass beneath the incoming and outgoing straight sections of the conveyor 20 as will be ascertained by the inspection of FIGURES 1 and 11. The cam 94 (see FIG. 7) is provided with a downward decline 353 in the vicinity of 270 degrees which allows the fixture 131 and the cabinet 24 to be lowered to the portion 191 of the hanger 22 before the cabinet is released by the actuation of the 4-way valve 240 by the cam 234. The incline 354 of the cam 94 between the declines 353 and 355 raises the fixture 131 up away from the cabinet 24 for clearance when the fixture tilts out and away from the cabinet on the following decline 355. This cam 94 also includes a second decline 355 which moves the fixture away from the cabinet and outwardly for passing beneath the straight portion of the conveyor 20. The lower outer cam track 420 extends to a decline 430. It extends to a gate 432 (see FIG. 13) which is pivoted on the pivot 357 at the end of section 434 of the upper outer cam 169 to provide a fall or decline in the movement of the cam follower 167 down to the level of the lower cam 420. This gate 432 is operated by an air cylinder 359 through suitable switches 360 and 362 upon the track portions 420 and 434 operated by the cam follower roller 167 as it rolls on the cam tracks 169 and 420. However, the roller cam follower 167 also can mechanically engage the bottom of the gate 432 to mechanically lift the gate and so pass beneath while it continues on the cam track 420. This will in conjunction with the decline 434 at the end of the cam 169 move the fixture 131 to a horizontal position for passage beneath the straight sections of the conveyor 20. In addition, as indicated in FIGURE 8, the fixture 131 will pass over the second Geneva cam arrangement 363 mounted on a second horizontal platform 365 beneath the two straight sections of the conveyor 20. This platform 365 and the second Geneva cam 363 are similar to the platform 266 and the Geneva cam 268 shown in FIGURE 6 and are also similar to the showing of the Geneva cam and platform in FIGURE 3 with the exception of the horizontal position of the platform 365 and the cam 363 and an arrangement for lowering them. Alongside of the platform 365 is a low horizontal portion 367 of the outer cam 169 which is engaged by the roller follower 167 to support the fixture 131 and the frame 98 in the horizontal position as shown in FIGURE 8. The platform 365 also includes a second locking pin cam 369 corresponding to the cam 149 for acting on the roller follower 147 and through the toggle links 143 to withdraw the locking pin 137 from the shaft means 123 to permit the second Geneva cam 363 to engage the rollers 129 and one of the noses of the bar 125 to turn the fixture 131 through 180° to return it to its original orientation so as to prepare it for receiving another cabinet. To prevent the fixtures 131 operating upon the lower outer cam track section 420 from being turned by the second Geneva cam 363, the platform 365 is lowered out of the path of the turning bar 125 and its rollers 129 by the air pistons and cylinders 441 beneath the platform 365. This lowering is controlled by an electrically operable 4-way valve 443 controlled by the switches 445 and 447 (see FIGS. 1 and 8) associated with the outer cam track and located in the path of movement of and operated in sequence by the roller follower 167. Thus, the fixtures 131 which do not carry the cabinets 24 will not be turned by either the first Geneva cam 268 or the second Geneva cam 363.

Although only one linkage connection of the central pole 44 with one of the fixtures is shown and described specifically, it should be understood that the remaining seven sets of linkages and fixtures are identical to the one described and are located symmetrically about the pole 44 and are likewise carried about in synchronism with the supports 22 upon the conveyor 20. Also, each is similarly controlled. Thus a fixture is presented for each support 22 on the conveyor and they are maintained in synchronism throughout their aligned movement through the loop portion of the conveyor 20.

While the embodiment of the present invention as herein disclosed, constitutes a preferred form, it is to be understood that other forms might be adopted.

What is claimed is as follows:

1. In combination, conveyor means having a plurality of hook type support means extending into and through the open side of box shaped articles having upper and lower ends and having an open side for supporting and conveying said articles, a fixture having gripping means for gripping one of said articles, means for moving said fixture with said one article gripped thereto upwardly relative to and away from said conveyor means for lifting said one article off one of said support means and moving the article away from the conveyor means, means effective when said fixture is moved away from said conveyor means with said one article gripped thereto for turning at least a portion of said fixture and said one article end for end, means for moving the turned fixture portion with said one article gripped thereto into the vicinity of the conveyor means and moving the inverted article over one of said support means, and means for releasing said gripping means to drop the inverted article upon said support means.

2. In combination, conveyor means having a plurality of hook type support means extending into and through the open side of box shaped articles having upper and lower ends and having an open side for supporting and conveying said articles, a fixture having gripping means for gripping one of said articles, means for moving said fixture with said one article gripped thereto upwardly relative to and away from said conveyor means for lifting said one article off one of said support means and moving the article away from the conveyor means, means effective when said fixture is moved away from said conveyor means with said one article gripped thereto for turning at least a portion of said fixture and said one article end for end, means for moving the turned fixture portion with said one article gripped thereto into the vicinity of the conveyor means and moving the inverted article over one of said support means, and means for releasing said gripping means to drop the inverted article upon said support means, and means for returning said fixture to its original position.

3. In combination, an overhead conveyor having a loop portion and having a plurality of hook type support means extending into and through the open side into supporting relationship with a plurality of box shaped articles having an open side, means centered relative to said loop portion and revolving about the center of said loop portion for removing said articles one by one from said hook type support means and inverting said articles and replacing said articles upon said support means in the inverted position.

4. In combination, an overhead conveyor having a loop portion and having a plurality of hook type support means extending into and through the open side into supporting relationship with a plurality of box shaped articles having an open side and upper and lower ends, a plurality of fixtures generally centered relative to said loop portion, means for revolving said fixtures about the center of said loop in synchronism with said conveyor, means for moving said fixtures one by one in position to grip said articles and lift said articles from said support means, means responsive to the movement of the fixture into position for gripping said one article to the positioned fixture, and means for turning end for end each of said fixtures and articles after the articles have been gripped, and means placing said fixtures in position to drop said inverted articles upon said supports and releasing the grip to replace the articles in the inverted position of the conveyor.

5. In combination, an overhead conveyor having a loop portion and having a plurality of hook type support means extending into and through the open side into supporting relationship with a plurality of box shaped articles having an open side and upper and lower ends, a plurality of fixtures having gripping means for said articles, means for moving said fixtures beneath said conveyor and in synchronism with said conveyor, around the center of said loop, means responsive to the movement of a fixture to a first zone for lifting said fixture and concurrently operating said gripping means to grip and lift an article from said support means adjacent said first station, means for turning said fixture with said gripped article thereon end for end, means responsive to the movement of a fixture through a third zone for lifting said turned fixture and article and concurrently releasing said gripping means to place the turned and released article on the support means.

6. In combination, an overhead conveyor having a loop portion and having a plurality of hook type support means extending into and through the open side into supporting relationship with a plurality of box shaped articles having an open side and upper and lower ends, a plurality of fixures having gripping means for said articles, means for moving said fixtures beneath said conveyor and in synchronism with said conveyor, around the center of said loop, means responsive to the movement of a fixture to a first zone for lifting said fixture and concurrently operating said gripping means to grip and lift an article from said support means adjacent said first station, means for turning said fixture with said gripped article thereon end for end, means responsive to the movement of a fixture through a third zone for lifting said turned fixture and article and concurrently releasing said gripping means to place the turned and released article on the support means, and means responsive to the movement of a fixture through a fourth zone for lowering said fixture for passage beneath said conveyor.

7. In combination, an overhead conveyor having a loop portion and having a plurality of hook type support means extending into and through the open side into supporting relationship with a plurality of box shaped articles having an open side and upper and lower ends, a plurality of fixtures having gripping means for said articles, means for moving said fixtures beneath said conveyor and in sychronism with said conveyor, around the center of said loop, means responsive to the movement of a fixture to a first zone for lifting said fixture and concurrently operating said gripping means to grip and lift an article from said support means adjacent said first station, means for turning said fixture with said gripped article thereon end for end, means responsive to the movement of a fixture through a third zone for lifting said turned fixture and article and concurrently releasing said gripping means to place the turned and released article on the support means, and means responsive to the movement of a fixture through a fourth zone for lowering said fixture for passage beneath said conveyor and for turning said fixture end for end and for returning said conveyor to its original position.

8. In combination, a conveyor having means for supporting and moving articles, a fixture provided with gripping means for said articles, means for moving said fixture in synchronism with said articles, means for aligning an article with said fixture, means for moving said fixture into contact with the article, means operable coincidentally to the contact of the fixture with the article for operaing said gripping means to lock the article to the fixture, means for moving said fixture with the article thereon away from said conveyor and turning said fixture with the article thereon, means for moving said fixture back to said conveyor to place the article over said means for supporting and moving articles, and means for coincidentally releasing said gripping means to release the article to replace the article on the conveyor.

9. In combination, an overhead conveyor having a plurality of hooks in spaced relation depending therefrom adapted to carry open box-shaped articles, a U-shaped member, means for moving said U-shaped member in alignment with said hooks, means for moving said U-shaped member into the interior of the open box shaped article around the hook upon which the article is suspended, means for aligning the hook on which the article is suspended relative to said U-shaped member, and means for removing the article from said hook, turning the article and returning the article to the hook.

10. In combination, a conveyor having alternate first and second track portions and means for supporting and moving articles having different configurations, removing means for removing articles from the first track portion of the conveyor, means responsive to a difference in the configuration of some articles for directing the different articles onto said second track portion for preventing the removing means from removing those articles from the conveyor means, means for turning the articles removed from the first track portion of the conveyor, and means for replacing the turned articles in the turned position upon the conveyor.

References Cited by the Examiner

UNITED STATES PATENTS

| | | | |
|---|---|---|---|
| 1,282,853 | 10/1918 | Kelle | 74—103 |
| 1,542,763 | 6/1925 | Colegrove | 74—103 |
| 2,293,192 | 8/1942 | Campbell. | |
| 2,534,221 | 12/1950 | Brokmann. | |
| 2,639,822 | 5/1953 | Sax. | |
| 2,771,175 | 11/1956 | Da Costa | 198—25 |
| 2,833,434 | 5/1958 | Stover. | |
| 2,851,147 | 9/1958 | Hageline. | |
| 2,877,884 | 3/1959 | Esenwein. | |
| 2,949,996 | 8/1960 | Tonelli | 198—25 |

MARVIN A. CHAMPION, *Primary Examiner.*